United States Patent [19]

Nerenhausen, Sr.

[11] Patent Number: 5,685,414
[45] Date of Patent: Nov. 11, 1997

[54] ZERO BACK-PRESSURE CONVEYOR SYSTEM

[75] Inventor: James L. Nerenhausen, Sr., Oshkosh, Wis.

[73] Assignee: Nercon Engineering & Manufacturing, Inc., Oshkosh, Wis.

[21] Appl. No.: 636,178

[22] Filed: Apr. 19, 1996

[51] Int. Cl.$^6$ .................................................. B65G 15/00
[52] U.S. Cl. ..................................................... 198/809
[58] Field of Search ........................... 198/459.1, 459.6, 198/461.3, 809, 861.2

[56] References Cited

U.S. PATENT DOCUMENTS

| | | | |
|---|---|---|---|
| 3,934,707 | 1/1976 | Bowman | 198/809 X |
| 4,511,030 | 4/1985 | Lem | 198/809 X |
| 5,085,311 | 2/1992 | Garro | 198/809 X |
| 5,125,497 | 6/1992 | Sundermann | 198/809 X |

*Primary Examiner*—James R. Bidwell
*Attorney, Agent, or Firm*—Robert C. Curfiss

[57] ABSTRACT

An endless conveyor system includes movable lift rails for supporting the conveyed articles on either side of an endless conveying member. The lift rails are defined by end-to-end sections with adjacent ends of adjacent sections simultaneously movable between a lowered position wherein the articles may be engaged by the conveying member and a raised position wherein the articles are lifted above and out of engagement with the conveying members for interrupting the advancement of the articles with zero back-pressure.

15 Claims, 2 Drawing Sheets

ZERO BACK-PRESSURE CONVEYOR SYSTEM

BACKGROUND OF THE INVENTION

1. Field of the Invention

The subject invention is generally related to endless conveyors and is specifically directed to a conveyor system having zero back-pressure when advancement of conveyed articles is interrupted downstream.

2. Description of the Prior Art

Endless conveyor systems are well known. An example of a zero back-pressure conveyor is shown and described in U.S. Pat. No. 5,085,311; entitled: IN-LINE ACCUMULATOR WITH ZERO BACKLINE PRESSURE; issued to G. Garro on Feb. 4, 1992. As there shown, an endless chain or belt conveyor includes a pair of wear surfaces, one on either side of the belt to support the products being advanced by the chain. The belt is adapted to be displaced downwardly away from the chain when advancement downstream is interrupted, thereby permitting the conveyed articles to be supported only by the wear surfaces. A similar device is shown in Japanese Patent Document No. 0145018, dated Jul. 2, 1986.

While the claims of the Garro patent are limited to displacement of the belt or chain, with the wear surfaces stationary, the Garro patent also discloses an alternative embodiment in FIGS. 4 and 5, wherein the horizontal position of the chain is fixed and the wear surfaces are displaced therefrom to lift the articles above the chain.

While a conceptually sound idea, since this eliminated displacement of the moving chain, the Garro design is impractical in practice. As shown in Garro, the segmented wear surfaces were designed to lift horizontally away from the belt, leaving displaced, exposed ends and creating a discontinuous wear surface or guide surface. While all of the articles fully positioned on the wear surface would be properly lifted from the chain when a section of the wear surfaces were displaced, those overhanging the end of the displaced section would be tipped, or could be caught up between wear surface sections. In addition, the upstream articles would continue to move on the chain and would butt against the raised wear surface section, being potentially exposed to damage when the wear surface section was lowered into position.

Due to the drawbacks of this design, zero back pressure systems have relied generally on the displacement of the chain in order to maintain a continuous guide or wear surface for the conveyed articles. However, it is desirable to provide a zero backline pressure system wherein the moving chain or belt does not need to be displaced.

SUMMARY OF THE INVENTION

The subject invention is specifically directed to an improved zero back pressure conveyor system wherein the moving chain or belt does not require displacement in order to disengage the belt from the conveyed articles. The design of the subject invention is unique in that it accomplishes this without disrupting the continuous surface of the wear or guide member.

In the preferred embodiment of the invention, this is accomplished by providing segmented or sectioned end-to-end guide plates wherein adjacent ends are linked together with a coupler system. When one end of a section is raised above the chain, the adjacent end of the adjacent section is also raised, disengaging the articles along a portion of each section without disrupting the article support surface. As many section ends as required may be lifted, either in series or simultaneously, to provide an adequate length of support surface for the articles disrupted by a downstream interruption. The resulting lift surface, when disengaged, defines an upward and downward incline for the articles to sit on, eliminating any tipping or damage caused by overhanging articles or abutment edges.

The preferred embodiment utilizes a rigid link between sections, but other alternatives would be suitable provided adjacent ends of adjacent guide sections are simultaneously raised and lowered. A solenoid actuator has been used with good results, but other actuator mechanisms are equally suitable.

It is, therefore, an object and feature of the subject invention to provide a zero backline pressure system for an endless conveyor wherein the conveyor belt or chain may be selectively disengaged from the conveyed articles without displacement of the chain.

It is also an object and feature of the subject invention to provide a zero backline pressure system for an endless conveyor wherein selected sections of the guide or wear rails may be displaced from the conveyor belt or chain without disrupting the continuous support surface for the conveyed articles.

Other objects and features of the subject invention will be readily apparent from the accompanying drawings and detailed description of the preferred embodiment.

DETAILED DESCRIPTION OF THE PREFERRED EMBODIMENT

Figure 1:
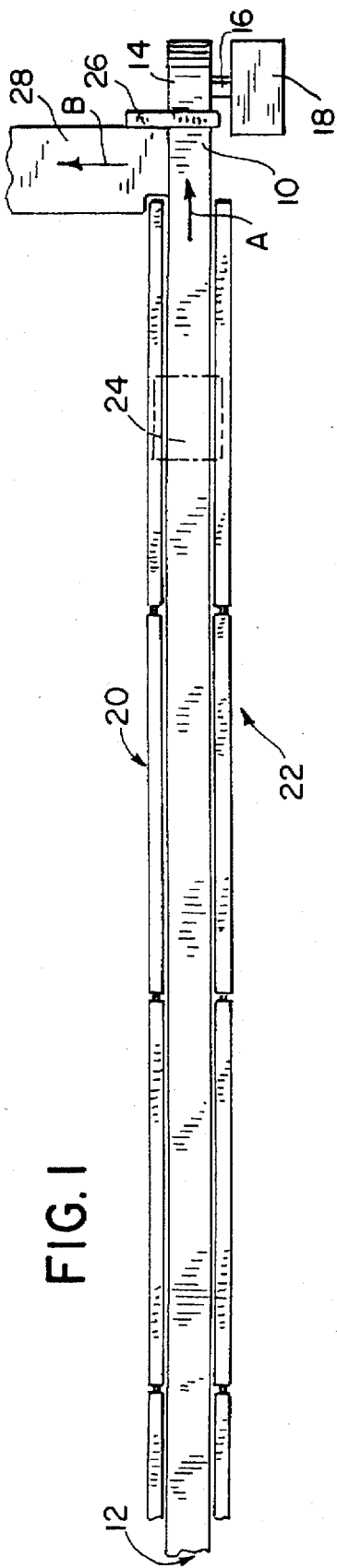
FIG. 1 is a diagrammatic plan view looking down on the top of the conveyor system in accordance with the subject invention.

A zero back-pressure conveyor system in accordance with the subject invention is shown if FIGS. 1–4. With specific reference to FIG. 1, The conveyor system includes at least one continuous or endless conveyor belt or chain 10 extending along an elongated path 12 and driven by drive mean such as the drive pulley or gear 14 mounted on the drive shaft 16 and driven by motive means such as motor 18. It will be understood that a second pulley or gear system is engaged with the conveyor belt at the opposite end of the path 12 in order to maintain proper tension on the belt, in the manner well known to those who are skilled in the art. Intermittent tension and support members may also be employed in order to maintain the belt at the proper horizontal position, depending on the length of the run. The entire mechanism is generally mounted on a support frame 19. The conveyor system may be open topped or closed topped, depending upon the application. Typically, food processing systems are required to be closed topped in order to meet FDA regulations which do not permit the return run of the conveyor belt or chain 10 to be exposed to the forward run. The drawings illustrate an open-top raised wearstrip construction. However, the subject invention is equally adaptable to a closed-top configuration.

A pair of side rails 20, 22 are employed and are disposed on opposite sides of the belt or chain 10. The lift rails are used to support the product or articles 24 (shown in phantom) when they need to be lifted off of the moving chain 10. As shown in the drawings, the conveyor belt is advancing in the direction of arrow A.

Figure 2:
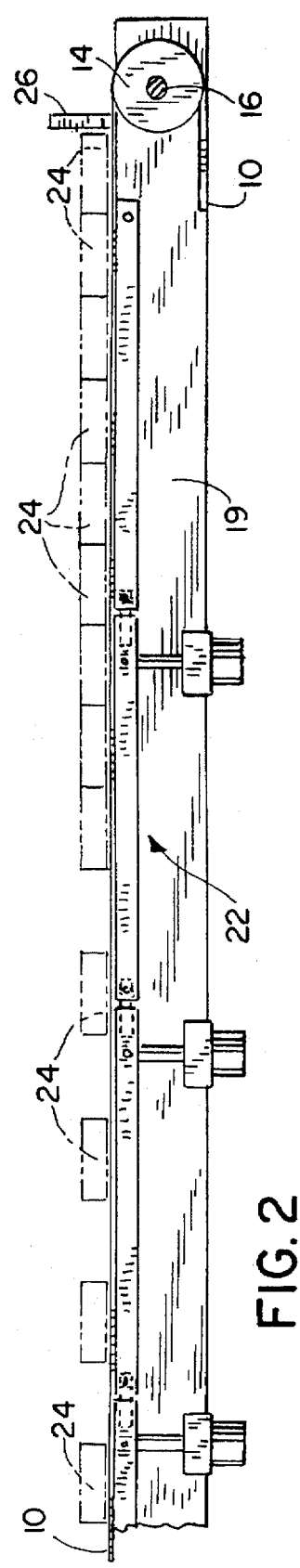
FIG. 2 is a side elevation view of the conveyor system of FIG. 1 with the side rails in the lowered position for permitting the advancement of product along the conveyor.

Typically, the product 24 either transfers on to another conveyor 28 in line with the first conveyor or at right angles to it. As best shown in FIG. 2, if the belt or chain on conveyor 28 is running at a slower rate than conveyor 10, the products then accumulate along the length of conveyor 10.

Figure 3:
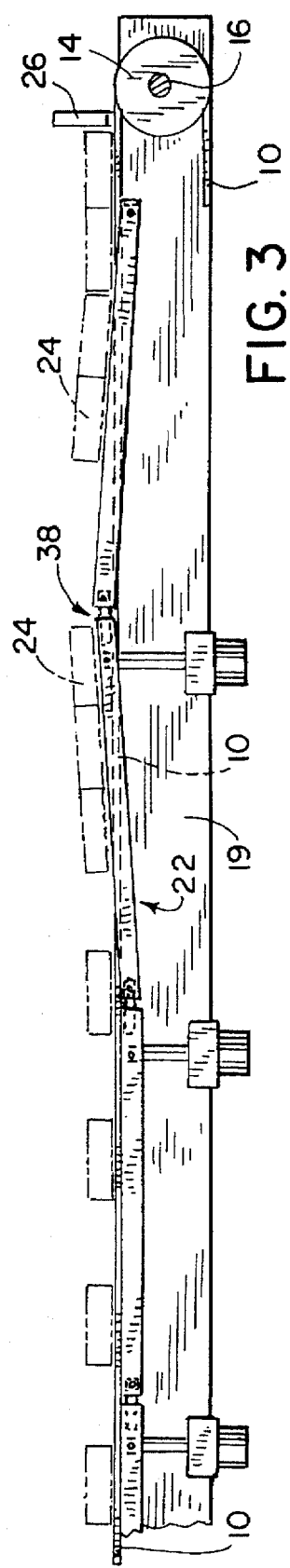
FIG. 3 is a view looking in the same direction as FIG. 2, with a portion of the side rails raised to provide zero back pressure interruption of the advancement of the product along the conveyor system.
Figure 4:
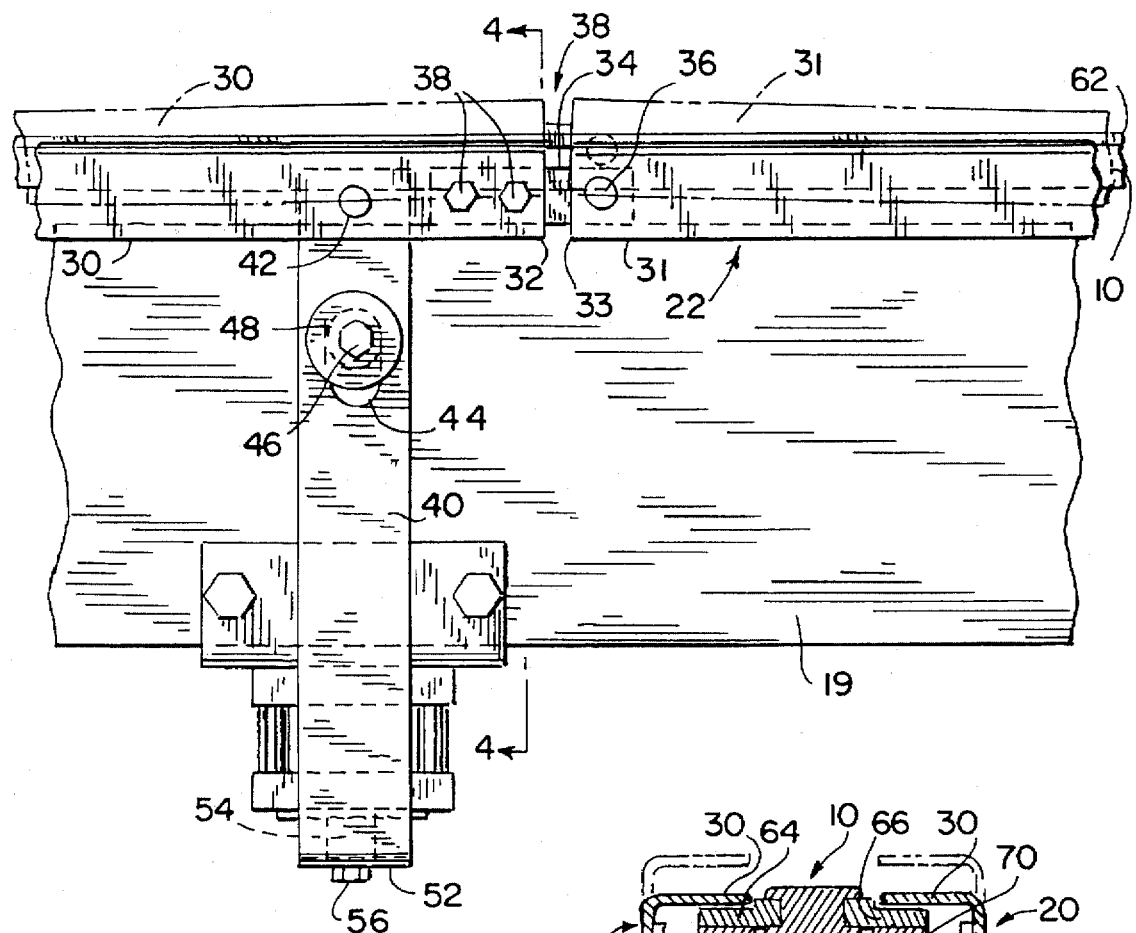
FIG. 4 is a partial side view, looking in the same direction as FIG. 2 and enlarged for clarity, showing the details of a mechanism for raising and lowering a section of side rail in accordance with the teachings of the subject invention.

In the subject invention, this is accomplished by providing segmented side rails 20 and 22. As more clearly shown in FIGS. 4 and 5, each of the side rails 20 and 22 includes a series of sections 30 and 31 running along the length of the conveyor run. The sections 30 and 31 are linked together at their adjacent ends 32 and 33, respectively, by a link or coupler member 34. In the preferred embodiment, the link 34 is pivotally secured to at least one section 31, as illustrated at pivot pin 36. The opposite end of the link is fixedly secured to the adjacent section 30 by suitable means such as the bolts 38. Thus, when end 32 of section 30 is raised above the belt 10, as shown in FIGS. 3 and 4, the linked end 33 of section 31 will follow, providing a peak 39 between rail sections. This permits the product articles 24 to be lifted above the moving conveyor belt 10 to stop their advancement with zero back-pressure. Also, by using the peak configuration of the preferred embodiment, the typical "catch-point" or "dam" created between side rail sections is eliminated. Not only does this make for smoother operation of the system, but it also protects fragile articles from damage due to catching or snagging on the end pieces of the raised sections, particularly when the raised rail section is lowered to permit further advancement of the interrupted articles.

Figure 5:
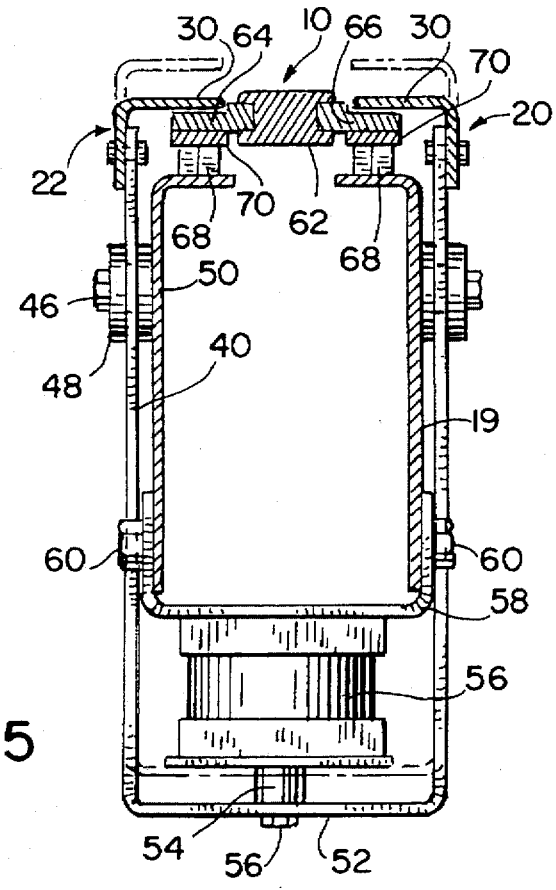
FIG. 5 is a sectional view taken along the line 4—4 of FIG. 3.

In the preferred embodiment, the lift mechanism is utilized to mount the side rails 20, 22 on the frame 19. As best shown in FIGS. 4 and 5, the lift mechanism comprises a strap member 40 pivotally mounted near the linked end 32 of the rail 30, as illustrated at pivot pin 42. An elongated slot 44 is provided in the strap for receiving the guide pin or bolt 46 mounted in frame 19. The enlarged head 48 may be an integral part of the bolt 46 or may be provided by a spacer or washer or the like. Typically, a spacer 50 (FIG. 5) is also provided between the strap 40 and the frame 19. The lower portion or run 52 of the strap is secured to an actuator shaft 54 by mounting bolt 56 or other suitable means. The actuator shaft 54 is axially movable between the lowered position and the raised position (in phantom) as shown in FIG. 5 to bring the guide rails 20 and 22 in to alignment with or raise the guide rails 20 and 22 above the conveyor belt 10. The actuator shift is typically driven by actuator 56 or other suitable means which is mounted on the frame 19 as illustrated by mounting bracket 58 and bolts 60. In the preferred embodiment, the strap 40 is U-shaped and is adapted to be connected to aligned ends of side rails 20 and 22 on opposite sides of the belt 10, to assure simultaneous raising and lowering of the opposite side rail sections.

As best seen in FIG. 5, the conveyor belt or chain 10 can be any of the well known configurations ranging from a continuous belt to a segmented chain having a product support member 62, mounted between low friction bearing surfaces 64, 66 which are supported by spacers 68 and back-up bar 70 above frame 19.

While certain features and embodiments of the invention have been described in detail herein, it will be readily understood that the invention incorporates all enhancements and modifications within the scope and spirit of the accompanying claims.

What is claimed is:

1. A zero back-pressure conveyor system of the type having a movable member for advancing articles; and a lift rail adjacent to the movable member for supporting the articles, the lift rail further comprising:

a. a first section having opposite ends;

b. a second section adjacent to the first section and in longitudinal alignment therewith, having opposite ends, wherein one end of the first section is adjacent to and in alignment with the one end of the second section;

c. a coupler connecting the adjacent ends of the first and second sections for defining linked ends, the coupler be pivotally mounted on one of said ends and fixedly secured to the other of said ends; and d. an actuator connected to one of said sections adjacent to said linked ends and adapted for raising and lowering the linked ends relative to the movable member.

2. The zero back-pressure conveyor system of claim 1, wherein the movable member is an endless element.

3. The zero back-pressure conveyor system of claim 1, further including parallel lift rails on either side of the movable member.

4. The zero back-pressure conveyor system of claim 1, further including a support frame, with the movable member, the lift rail and the actuator supported by the support frame.

5. The zero back-pressure conveyor system of claim 1, wherein the actuator comprises a drive mechanism mounted on the support frame, a movable driver extending outwardly from the motive means, the driver being secured to the said section adjacent to the linked end for supporting the section on the support frame and for driving the section between the raised and lowered positions.

6. The zero back-pressure conveyor system of claim 5, wherein the motive mechanism comprises a solenoid actuator with a drive shaft extending outwardly therefrom for defining the driver, and wherein the driver further includes a strap for securing the drive shaft to the lift rail section.

7. The zero back-pressure conveyor system of claim 6, further including opposite, parallel lift rails on either side of the movable member, wherein the strap is adapted for engaging opposite guide rails for simultaneously raising and lowering same in response to the solenoid actuator.

8. The zero back-pressure conveyor system of claim 1, further including a gate positioned in the path of the movable element for directing the flow of articles advancing therealong.

9. The zero back-pressure conveyor system of claim 1, wherein the movable member is an endless belt.

10. The zero back-pressure conveyor system of claim 1, wherein the movable member is a segmented chain.

11. A zero back-pressure conveyor system of the type having a endless element mounted on a support frame and movable for advancing articles in a desired direction along a path, and a lift rail along a side of the movable element for supporting the articles, the lift rail comprising a plurality of end-to-end sections having opposite ends, with adjacent ends of the end-to-end sections placed in juxtaposition with one another, the system further comprising:

a. an actuator mechanism attached to said adjacent ends for simultaneously raising and lowering said adjacent ends of said adjacent end-to-end sections for lowering and raising said adjacent ends relative to said endless member.

12. The zero back-pressure conveyor system of claim 11, further comprising:

a. a coupler connecting the adjacent ends of said end-to-end sections for defining linked ends, the coupler be pivotally mounted on one of said ends and fixedly secured to the other of said ends; and d. an actuator connected to one of said sections adjacent to said linked ends and adapted for raising and lowering the linked ends relative to the movable member.

13. The zero back-pressure conveyor system of claim 12, further including parallel lift rails on either side of the movable member.

14. The zero back-pressure conveyor system of claim 13, wherein the actuator comprises a drive mechanism mounted on the support frame, a movable driver extending outwardly from the motive means, the driver being secured to the said section adjacent to the linked end for supporting the section on the support frame and for driving the section between the raised and lowered positions.

15. The zero back-pressure conveyor system of claim 14, wherein the motive mechanism comprises a solenoid actuator with a drive shaft extending outwardly therefrom for defining the driver, and wherein the driver further includes a strap for securing the drive shaft to the guide rail section.

* * * * *